Jan. 22, 1935.  R. S. HUNTER  1,988,556
GLOSS MEASURING DEVICE
Filed Feb. 28, 1934  2 Sheets-Sheet 1

Inventor
Richard S. Hunter
By K. P. McElroy
his Attorney

Jan. 22, 1935.　　　　　R. S. HUNTER　　　　　1,988,556
GLOSS MEASURING DEVICE
Filed Feb. 28, 1934　　　2 Sheets-Sheet 2
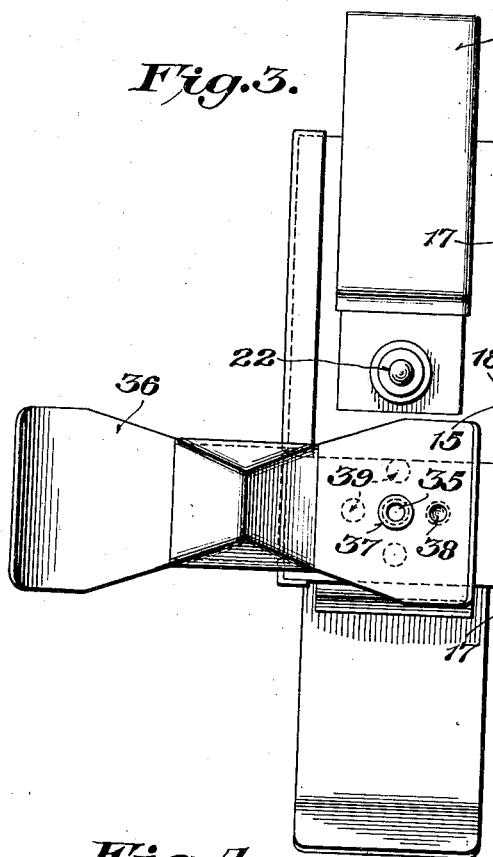
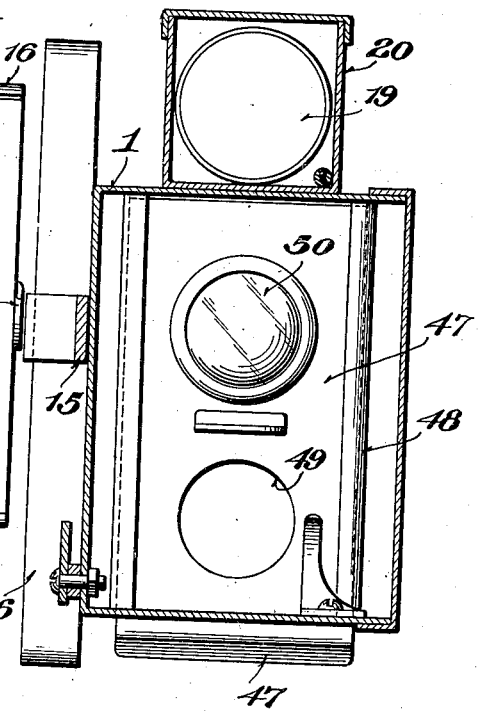
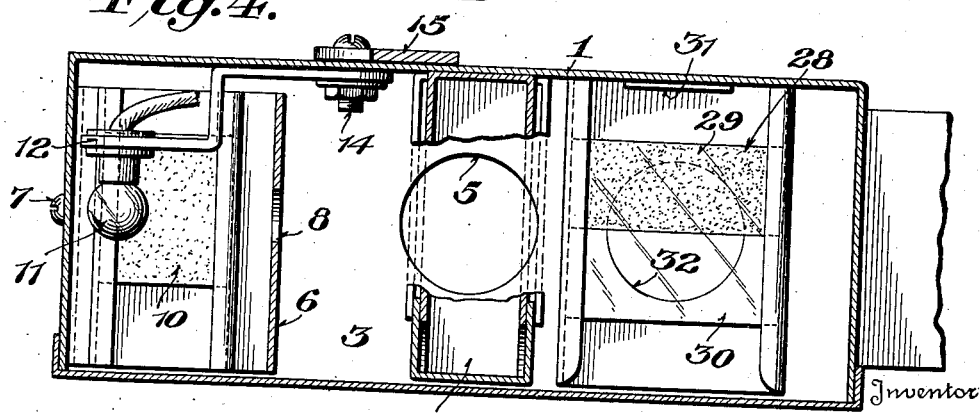

Patented Jan. 22, 1935

1,988,556

UNITED STATES PATENT OFFICE 1,988,556

GLOSS MEASURING DEVICE

Richard Sewall Hunter, Franklin Park, Va., assignor to Henry A. Gardner, Washington, D. C.

Application February 28, 1934, Serial No. 713,367

5 Claims. (Cl. 88—14)

This invention relates to gloss measuring devices; and it comprises an apparatus for measuring the gloss of surfaces and capable of being applied directly to a glossy surface, said apparatus comprising two opposed elements having diffusely reflecting surfaces, a standard element having a specular reflecting surface, means for simultaneously illuminating the two diffusely reflecting surfaces, means for varying the relative illuminations on the said two surfaces, photometer means adapted to receive a beam from one of said diffusely reflecting surfaces specularly reflected from the standard member, and simultaneously to receive a beam from the other of said diffusely reflecting surfaces reflected specularly from the glossy surface under measurement, and indicating means controlled by the said illumination-varying means; all as more fully hereinafter set forth and as claimed.

The surfaces of materials such as paper, paint, enameled metal and the like vary considerably in their glossiness or shininess. The glossiness varies over a wide range: from the maximum possible degree in the case of a mirror-like or specular surface such as that of polished glass, to the slight degree of glossiness in the case of matt paper, chalk and the like. "Gloss" is a quality difficult to define and to measure. A gloss finish and a flat finish are both well understood expressions; but it is difficult to define either in numerical terms or by reference to any standard. Quantitative expression has long been a desideratum. Such information is particularly desirable in the paint and varnish industry, where it is often necessary to duplicate a paint sample not only by color but by gloss or flatness as the case may be; or to classify coated samples according to the relative gloss of their surfaces.

Various propositions have been made looking towards determining gloss in terms of an index number. One is based on the fact that light reflected specularly from surfaces of paint, etc. is polarized, the degree of polarization depending upon the degree to which the surface is like that of polished glass. A measurement of the degree of polarization of light reflected in a certain direction from a sample surface gives an indication of the gloss of the surface, but is subject to a number of objections. For one thing, in measuring instruments of the polarization type which have been proposed, the measurement takes into account not only the proportion of light reflected specularly, but also includes, to a large extent, the effect of light scattered diffusely from the sample. In the existing polarization instruments proposed the measurements vary with the diffuse reflection coefficient of the sample. Different gloss indications will be obtained in the case of two equally glossy surfaces, one of which is light and one dark. With existing instruments a gloss measurement by polarized light of a paint sample containing dark pigment differs from a measurement of a similar sample containing a light pigment.

I have found that in making paint and varnish gloss measurements, a more useful indication may be had by measuring the relative intensity of a beam reflected at the same angle from the sample surface and from a standard specular surface. With proper design, corrections to allow for lightness or darkness of the sample may be reduced to a minimum, and the small corrections necessary may be readily and accurately ascertained. In practice, gloss indications obtained by such measurement are found to correspond in a satisfactory way to the degree of glossiness as observed qualitatively by the eye.

In the present invention provision is made for comparing with light reflected from a standard specular surface, the light regularly reflected from the surface of the sample, substantially eliminating effects of light which has penetrated the surface of the sample and has thence returned after diffuse reflection. This diffusely reflected light accounts largely for the color and lightness of the reflecting surface. In the present instrument these factors are substantially eliminated from the measurement of gloss. White light after reflection from the surface of most translucent colored things is white. Light penetrating the surface is reflected from or absorbed in the pigment particles, dyes, etc. in the paint or varnish or textile fibers, and becomes colored, but this colored light is in general reflected more or less diffusely. By minimizing the diffusely reflected component of the total light reflected from the sample, I minimize the effects of absorption: color and lightness.

This procedure may be said to measure objective gloss, which is the term which has been applied to gloss measurements involving measurement or comparison of the specularly reflected component alone. This way of measuring and defining gloss has the advantage that the results are independent of the body color of the sample. For example, gloss measurements made with the present instrument of a certain linseed oil varnish containing black pigment, and the same varnish left clear, are substantially the same in value. Measurements made by certain other methods give different values for the clear and the pigmented varnish.

In the present invention I provide an improved device for measuring the relative intensity of a beam reflected specularly from a surface under test, as compared with that of a beam specularly reflected from a standard surface, such as a piece of polished glass or a mirror. I separately illuminate the sample and the standard, compare the relative intensities of the beams reflected from the sample and standard, and vary the relative illuminations until the intensities of the reflected beams are equal. Then the relative illuminations on standard and sample serve as a measure of the gloss of the sample.

In practical embodiments of the present invention I provide two elements having diffusely reflecting surfaces, means for illuminating these surfaces and means for varying the relative illumination on the surfaces, a standard element having a specular surface, means for illuminating the standard from one of the diffusely reflecting surfaces and for illuminating a sample from the other diffusely reflecting surface, and photometer means for comparing the relative intensity of light reflected from the standard and sample at the same angle. In operating the device, the relative illumination on the diffusely reflecting surfaces is varied until the intensity of the reflected beams is the same, and the position of the means for varying the relative illumination on the two diffusely reflecting surfaces is taken as an indication of the gloss of the sample.

In the accompanying drawings I have shown, more or less diagrammatically, one form of a specific device within the invention. In these showings, Fig. 1 is a view partly in elevation, partly in vertical section, of a complete apparatus, the cover being left off for clarity;

Fig. 3 is a view in elevation of the eyepiece end of the apparatus;

Fig. 4 is a view in section taken along line 4—4 of Fig. 1; and

Fig. 5 is a view in section taken along line 5—5 of Fig. 1.

Figure 1:
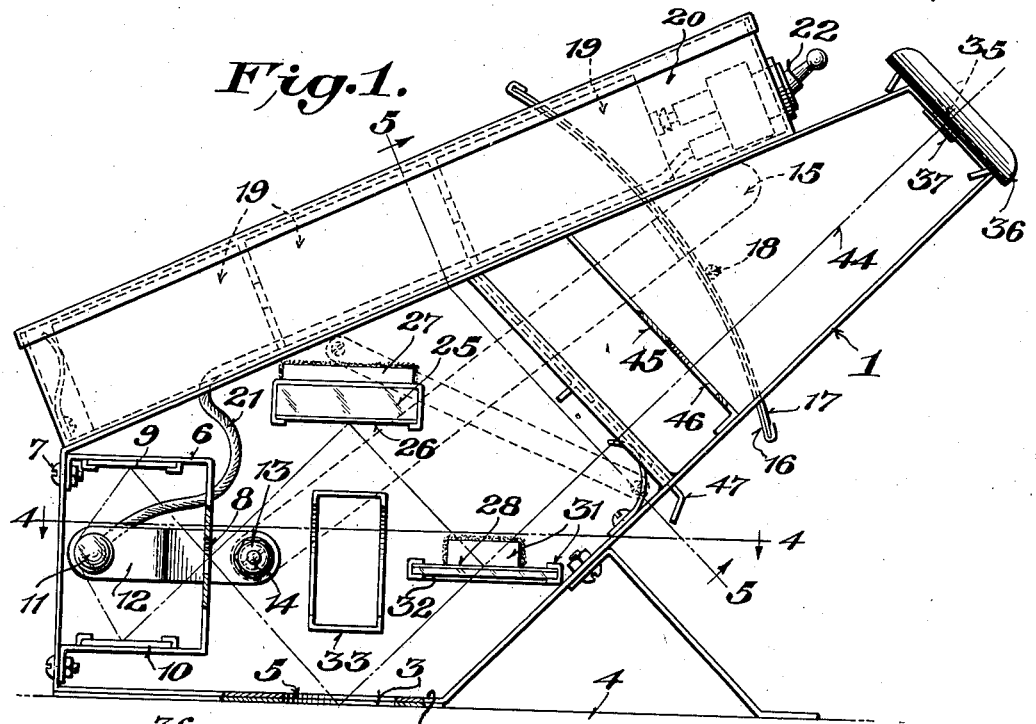
Figure 2:
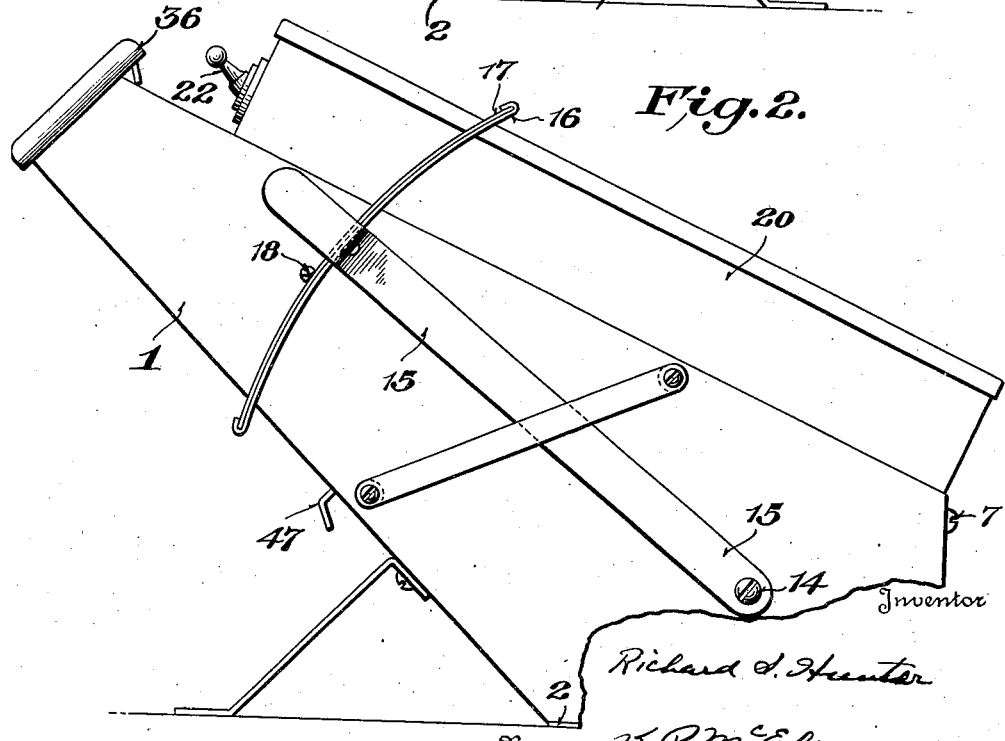
Fig. 2 is a view in elevation of the back of the apparatus.

In these showings, in which like reference characters indicate like parts throughout, the apparatus is shown as comprising a casing 1 having a base 2 adapted to be applied to the surface 3 of a sample 4 of material to be tested. The base is provided with an aperture 5 open to the sample, as shown in Figs. 1 and 4. The aperture forms a zone for accommodating the sample. The bottom of the base is covered with black felt, as shown, to prevent marring of the surface under test and to prevent any stray light from entering the instrument. A light box 6 is mounted in the casing by bolts and nuts 7 as shown, and is provided with an aperture 8. Two diffusely reflecting elements 9 and 10 are mounted in the light box in opposed relation as shown. These may take the form of ground opal glass plates, plaster slabs, or matt-surfaced paper. Paper reflecting elements are convenient. A small incandescent bulb 11, advantageously frosted to nullify lens effects of the globe due to striations in the glass, is carried on a swinging arm 12, pivoted to the casing at 13 by a bolt 14. The bolt extends outside the casing and carries a swingable lever 15 mounted outside the casing (see Fig. 2). By swinging the lever, the arm and the lamp may be moved to different positions with respect to elements 9 and 10, varying the relative illuminations thereon. The swinging end of the arm carries an arcuate member 16 having a graduated scale 17 (see Figs. 1 and 3) adapted to register with an index 18 mounted on the casing.

The lamp is supplied with current by dry cells 19, which may be of the ordinary flash light type, carried on the casing in a box 20. A wire 21 connects the battery of cells with the lamp, and a switch 22 controls the current. Other sources of current may be used if desired.

In operation, elements 9 and 10 serve as indirect sources of light. Light from them radiates through aperture 8.

A standard element 25 having a specular surface 26 is mounted in the casing by a bracket 27, in opposed relation to the aperture 5. This standard element is advantageously a polished plate of black glass. Using black glass, all rays entering the body of the glass are absorbed, and the only light reflected is that from the surface. In measurements of the gloss of or the reflection from polished metal surfaces the standard would take the form of a polished plate of metal, or a surface silvered glass mirror; but black glass is best for ordinary gloss determinations. As shown in Fig. 1, the surface 26 is adapted to receive light from the illuminated diffusing surface 10 through aperture 8. Also, the sample surface 3 is adapted to receive light from the illuminated diffusing surface 9.

A plate of glass 28 having one half of its upper surface silvered as at 29 (Fig. 4) and the other half left clear as at 30 is mounted in the casing by means of a bracket 31 having an aperture 32, as shown. The glass plate 28 is disposed half way between the standard surface 26 and the sample surface 3, parallel to these surfaces, and offset so that light reflected at 45 degrees, from the center of the standard and the sample surfaces, will impinge on the central part of the glass plate. If desired, the silvered portion of the plate may be in the form of a pattern. Part of the silvering may extend over the clear portion: an arrangement which facilitates the measuring operation under some conditions. The mirror may be of metal instead of glass, and may extend only over part of aperture 32, leaving the other part of the aperture open for direct viewing of the sample or standard. The silvered and clear portions of the mirror shown may be interchanged, in which case the standard surface is viewed directly and the silvered portion reflects light specularly reflected from the sample.

The centers of the sample and standard surfaces, of the glass plate 28, and of the aperture 8, lie at the four corners of a square as shown in Fig. 1. A box-like shield 33 is mounted in the casing as shown, to prevent direct light from bulb 11 from reaching the glass plate 28.

At the upper end of the casing is provided an aperture or sight-hole 35, to which the eye is applied during operation. An eye-shield 36 is pivoted at the sight-hole by means of a tubular rivet or bushing 37 as shown. The eye-shield is adapted to swing about the sight-hole and to be held in any one of four positions by means of a depressed detent 38 on the eye-shield adapted to engage any one of four depressions 39 in the casing as shown. The eye-shield is adapted to shut off stray light from the eye not in use. It is convenient but not essential.

The sight-hole is alined with the center of glass plate 28 and with the center of aperture 5, as indicated by axis 44 (Fig. 1). Between the sight-hole and plate 28 are mounted in spaced relation a shield 45 having an aperture 46, and a sliding plate 47 adapted to slide in slides 48. The plate has an aperture 49 (Fig. 5) and a lens 50 mounted in the plate. By sliding the plate either the aperture or the lens may be brought into alinement with axis 44. In Fig. 1 the aperture is shown in position, the lens being out of use. This position permits direct visual inspection of the sample surface. When gloss measurements are being made, the lens is brought into position.

The lens is of such strength and is so positioned that when the lens is in place the eye is in position at the sight-hole, the partly silvered surface of glass plate 28 is in sharp focus. With this arrangement the dividing line between the silvered half and the unsilvered half of the glass plate is seen sharply defined, while the surface of the sample is out of focus. Thus minor irregularities of the sample surface are prevented from confusing the eye or interfering with the gloss measurement. At the same time, the lens serves to focus rays from the aperture 8 (as reflected from standard surface 26 and the silvered half of plate 28) upon the sight-hole. The image of aperture 8 being at the sight-hole, to which the eye is applied during operation, the aperture is not seen by the eye. Aperture 46 serves as field stop for the optical system; it determines the size of the field seen by the eye. When the instrument is in use, the complete aperture of the lens appears luminous. It is convenient to have the aperture, and thus the field, circular.

The inside of the casing, the light box, and all surfaces of brackets, etc. are advantageously coated with matt black enamel to absorb stray light. A light-tight cover (not shown) is provided for the open side of the instrument.

The lamp being turned on, and the lens being in position alined with axis 44, the path of rays is as follows: elements 9 and 10 are illuminated by the lamp. Elements 9 and 10 serve as two secondary sources of illumination. Light diffusely reflected from 9 passes through aperture 8 and falls on sample surface 3 at an angle to the normal thereto. A certain amount of the incident light is diffusely scattered in all directions, the proportion being great for dull surfaces, less for glossy surfaces and very nearly zero for mirror-like surfaces. This diffusely reflected light is, except for a very small proportion reflected along axis 44, absorbed by the blackened casing, and plays no part in the measurements. The balance of the incident light is reflected specularly along axis 44, combined with the small proportion of light scattered diffusely in the same direction; the angle of reflection for the specularly reflected light being equal to the angle of incidence of light from element 9.

Light from illuminated element 10 falls on the surface 26 of the standard at an angle to the normal thereto. The standard element being black glass, light entering the glass is absorbed. The surface being highly polished, substantially all the light reflected is reflected specularly, the angle of reflection being equal to the angle of incidence. The reflected light impinges on the silvered half of plate 28, and is again reflected, parallel to axis 44. Thus when the eye is in position at the sight-hole, it receives light reflected from the standard and from the silvered half of plate 28, in one side of the field; and receives light reflected from the sample, in the other side of the field.

In making a gloss measurement, the instrument is placed upon the surface to be measured, the light is turned on, and the eye is applied to the sight-hole. The eye sees an illuminated field, one half of which is brighter than the other. The lever 15 is swung in one direction or the other, which moves the lamp with respect to elements 9 and 10, varying the relative illumination thereon, until the halves of the field are of equal brightness, and the field appears as a uniformly illuminated area. This indicates that the intensity of the beams reflected specularly from the sample and from the source are of a certain definite relative intensity; the exact ratio depending upon the nature of the glass in plate 28 and of the reflecting power of the silvered portion of the plate. Then the scale value on scale 17 as indicated by index 18 is read off. This value corresponds to the gloss of the sample. Samples of different gloss would require a different relative illumination on elements 9 and 10, and hence a different lamp position, to secure equal intensities of the reflected beams. The position of the lamp, as indicated in the reading of scale 17, serves as a measure of the gloss.

Scale 17 is shown provided with purely arbitrary divisions. The scale may be divided in any manner desired. For example, instrument readings may be taken of a perfectly matt surface and of a perfectly specular surface, the corresponding scale positions may be marked 0 and 1000 respectively, and the scale then divided into equal steps between these limits. This gives an arbitrary gloss scale, convenient in paint and varnish work. Or, if desired, the scale may be graduated to indicate directly the relative intensities of the beams reflected from sample and standard, under equal illumination, from a source of a given size. A scale graduated in this way has unequal divisions. As stated, the arbitrary scale from 0 to 1000 with equal divisions is convenient. In gloss measurements with the present instrument graduated in this scale, polished metals give scale readings of several hundred. Painted and varnished samples usually run under 50.

In the instrument shown, the arrangement is such that measurements are made of the light specularly reflected from the sample at an angle of 45 degrees. The angles of incidence and reflection are the same (45 degrees) for sample and standard. This angle I have found to be convenient for gloss measurements of materials such as paints and varnishes, but for some purposes it is better to take measurements at a higher angle, or at a lower angle as in the case of extremely matt or flat surfaces. In adapting the instrument for such conditions the standard surface and apertured base are mounted closer together, or farther apart, as the case may be; and the optical system comprising the sight-hole, the aperture 46 and the lens and aperture assembly are shifted accordingly. If desired, the plate 28, lens and sight-hole may be replaced by other well-known photometer means. The arrangement shown, however, presents advantages in simplicity and cheapness, and serves my purposes well. Other well-known means for varying illumination may be used for the relative illumination on elements 9 and 10; but the movable lamp arrangement is simple and convenient.

The diffusely reflecting elements 9 and 10 may be of equal reflectance, for example both may be white paper; but I find that in measuring the gloss of paints and varnishes the range of gloss is such that it is best to make element 10 of less reflectance than element 9. Element 10 is conveniently a gray paper, and element 9 a white paper.

The size of aperture 8 is important. If the aperture is large, the relative proportion of light scattered diffusely from the sample to light reflected specularly therefrom is also large, necessitating a correction in the instrument readings. If the aperture is very small, the proportion of light scattered diffusely is also very small; but surface irregularities in the sample may throw off the reading. I have found that the best results on the whole can be obtained by using an aperture of medium size. A convenient size for aperture 8 is one which will give an aperture area equivalent to about 0.0025 of the total area of a hemisphere about the center of orifice 5. In an instrument made according to the present disclosure, the diameter of aperture 5 being 0.75 inches and all the other dimensions of the instrument corresponding to this, a diameter of 0.375 inch for aperture 8 fulfils this condition and gives good results. With this size aperture the proportion of light scattered diffusely from the sample, to the light reflected specularly, was small. In all cases the aperture is sufficiently small so that it serves to direct relatively unidirectional pencils or beams on the sample and on the standard. The correction to be subtracted from the gloss reading of the instrument in case it is desired to indicate the gloss without involving the diffusely reflected portion of the light, amounts, in an instrument of the proportion described, to 0.0025 times the diffuse reflection factor of the sample. On the gloss scale of 0 to 1000 described, the correction is 2.5 R, where R is the diffuse reflection factor of the sample. This is a minor correction. If aperture 8 is proportionally larger than in the specific case described, the correction will be larger; if aperture 8 is smaller, the correction will be smaller. In practical embodiments of the invention aperture 8, and hence the correction, are made as small as is convenient. If the sample surfaces are always accurately planed or smooth, a smaller aperture may be employed, and the correction for the diffusely scattered light becomes even less.

The instrument is useful in making measurements of the gloss of various materials. For example, the gloss of metallic surfaces and of textiles, such as silk, may be measured by the instrument in the manner described.

What I claim is:

1. Apparatus for measuring the gloss of surfaces and capable of being applied directly to a sample surface, said apparatus comprising two opposed elements having diffusely reflecting surfaces, a standard element having a specularly reflecting surface, means for simultaneously illuminating the two diffusely reflecting surfaces, means for varying the relative illumination on the said two surfaces, one of said diffusely reflecting surfaces being adapted to send light to the standard surface, the other of said diffusely reflecting surfaces being arranged to send light to the sample surface and photometer means arranged to receive light reflected specularly from the standard surface and from the sample surface.

2. Apparatus for measuring the gloss of surfaces and capable of being applied directly to a sample surface, said apparatus comprising two opposed elements having diffusely reflecting surfaces, a standard element having a specularly reflecting surface, means for simultaneously illuminating the two diffusely reflecting surfaces, means for varying the relative illumination on the said two surfaces, means for restricting light from the diffusing surfaces to a substantially unidirectional beam and photometer means adapted to receive a beam from one of said diffusely reflecting surfaces specularly reflected from the surface of the standard member, and simultaneously to receive a beam from the other of said diffusely reflecting surfaces reflected specularly from the sample surface under measurement.

3. The apparatus of claim 2 in which the means for illuminating the two diffusely reflecting surfaces is a lamp, and means are provided for moving the lamp with respect to said diffusely reflecting surfaces to vary the relative illumination thereof, and the indicating means are controlled by the position of the lamp.

4. The apparatus of claim 2 in which the photometer means comprises an element having a mirror surface and positioned so as to reflect the beam reflected from the standard specularly reflecting surface, parallel to the direction of light incident on the specular surface, the photometer means being arranged to receive directly a beam of light reflected specularly from the sample surface, and in which the photometer means also comprises optical means for viewing the mirror surface and for simultaneously viewing the sample surface direct.

5. The apparatus of claim 1 wherein indicating means are provided, controlled by said illumination varying means.

RICHARD SEWALL HUNTER.